(12) United States Patent
Yu et al.

(10) Patent No.: US 7,032,060 B2
(45) Date of Patent: Apr. 18, 2006

(54) CONTROL CHIP SUPPORTING PLURALITY OF BUSES AND CONTROL CHIP SET THEREOF

(75) Inventors: Chia-Hsing Yu, Taipei Hsien (TW); Chi-Hsin Lin, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 0 days.

(21) Appl. No.: 10/710,041

(22) Filed: Jun. 15, 2004

(65) Prior Publication Data

US 2004/0268014 A1 Dec. 30, 2004

(30) Foreign Application Priority Data

Jun. 25, 2003 (TW) .............................. 92117231 A

(51) Int. Cl.
*G06F 13/20* (2006.01)

(52) U.S. Cl. ...................................................... 710/313
(58) Field of Classification Search .................. 710/313
See application file for complete search history.

(56) References Cited

U.S. PATENT DOCUMENTS

| | | | | | |
|---|---|---|---|---|---|
| 5,781,746 | A | * | 7/1998 | Fleck | 710/306 |
| 6,148,357 | A | * | 11/2000 | Gulick et al. | 710/309 |
| 6,658,520 | B1 | * | 12/2003 | Bennett | 710/312 |
| 6,775,282 | B1 | * | 8/2004 | Vakkalagadda et al. | 370/392 |
| 6,886,066 | B1 | * | 4/2005 | Ishii | 710/305 |

OTHER PUBLICATIONS

Techrepublic, What to expect from the new bus standards, Sep. 24, 2002.*
Extremetech, Inside PCI Express, NIck Stam, Sep. 9, 2002.*
API Networks, The Hyper Transport Technology (HT) I/O Bus Architecture, white paper, Jun. 15, 2001.*

* cited by examiner

*Primary Examiner*—Rehana Perveen
*Assistant Examiner*—Christopher Daley
(74) *Attorney, Agent, or Firm*—Jiang Chyun IP Office

(57) ABSTRACT

A control chip supporting a plurality of buses and control chip set thereof is provided. A control chip supporting a plurality of buses chooses a type of bus for complying with another control chip based on the bus type thereby, wherein a device and a driving circuit are included. The device generates required controlling timings based on selection pins. The driving circuit enables required transmitting direction of pins based on selection pins per se.

18 Claims, 2 Drawing Sheets

CONTROL CHIP SUPPORTING PLURALITY OF BUSES AND CONTROL CHIP SET THEREOF

CROSS REFERENCE TO RELATED APPLICATIONS

This application claims the priority benefit of Taiwan application serial no. 92117231, filed Jun. 25, 2003.

BACKGROUND OF INVENTION

1. Field of the Invention

The present invention relates to a control chip, and more particularly, to a control chip supporting a plurality of buses and a control chip set thereof.

2. Description of the Related Art

Information processing and exchange has become an inevitable process for new knowledge acquiring in this information explosion era. According to the importance of which, the developments of current technology target fast information processing and fast transmission by all means, thus distributed process environment becomes a common choice of the computer systems. In this distributed process computer system, various buses serve to transmit and receive data between chips for different purposes. As to the control chip set for current computer motherboard, there are the Peripheral Component Inter-connection Express (PCI Express) bus, the Hyper Transport (HT) bus, and the VLINK bus for communication between the north bridge chip and the south chip. Notice that the VLINK bus is developed by VIA Technologies Incorporated for chip sets communication. Therefore, the north bridge chip and the south bridge chip of different control chip set cannot be cooperated since different buses are used.

Under the above condition, in other words, a south bridge chip employing PCI Express bus only supports a north bridge chip employing the same bus, or the buses to the north and the south bridge chip for a certain CPU are required to be the same type of bus. According to current trend for personal computer or computer system development, the north bridge chip receives instructions from the CPU for DRAM and display control chip, and controls computer peripherals and storage media via south bridge chip. Thus job division is achieved in a computer system.

However, in accordance with futuristic trend to computer development, it is most likely to embed the memory controller in the north bridge chip in the CPU, and the north bridge chip is replaced with the south bridge chip, which is directly connected to the CPU. An issue is arose that different south bridge chips are associated with corresponding CPUs while different bus interfaces are applied. For a chip set design house, the south bridge chip commonly serves to connect slower computer peripheral devices (e.g. keyboard, mouse or floppy disk drive), yet the specifications of which have been unified so that significant variation is not expected in near future. If the south bridge chip has to be redesigned in order to comply with the bus specification used by the CPU or the north bridge chip, not only manufacturing cost will increase by noticeable amount, but also product in stock has to be monitored with care. These issues hence become major challenging tasks for the chip set design house.

Therefore, a chip supporting a plurality of bus specifications has been developed, wherein a driving circuit is used between external pins and device of the chip. Before the chip is embedded in a motherboard or a computer system, the driving circuit serves to modify the bus specification supported by the chip and the definition of the external pins. Therefore, the chip supports a plurality of bus specifications with the device, and thus cost to chip design and manufacturing is significantly reduced.

SUMMARY OF INVENTION

In light of the above problems, it is a primary object of the present invention to provide a control chip supporting a plurality of buses and a control chip set thereof. The control chip in the present invention selects operating bus corresponding to the control chip therein, so as to facilitate cooperation between different control chips.

In accordance with the above objects and other advantages, as broadly embodied and described herein, the present invention provides a control chip set and its control chip for supporting a plurality of buses. The control chip set comprises a first control chip and a second control chip. The first control chip has a first bus which works as an operating bus of the control chip set. The second control chip supports a plurality of buses including the first bus, and generates a control timing for driving the first bus based on the choice of selection pins.

The second control chip serves as the control chip supporting a plurality of buses provided by the present invention, wherein control chip comprises a device and a driving circuit. The device generates a control timing for the first bus based on the choice of the selection pins. The driving circuit electrically couples to the device and enables the bus pins of the second control chip to support the transmission direction associated with the first bus based on the choice of the selection pins.

In accordance with an embodiment, the buses supported by the second control chip comprise a PCI Express bus, a HT bus, and a VLINK bus.

In accordance with an embodiment, the second control chip comprises three selection pins for providing a plurality of bus transmission directions comprising PCI Express bus transmitting, PCI Express bus receiving, HT bus transmitting, HT bus receiving and the VLINK bus bi-directional transmitting and receiving.

In accordance with an embodiment, the driving circuit comprises a first driver and a second driver for enabling and being adapted to the transmission direction associated with the first bus.

In accordance with an embodiment, the second control chip is a south bridge chip, while in accordance with another embodiment, the second control chip is a north bridge chip.

From descriptions above, by applying a control chip supporting a plurality of buses and a control chip set thereof provided by the present invention, an operating bus is selected according to the corresponding bus associated with the control chip, so as to facilitate the cooperation between different control chips.

These and other objects, features and advantages of the present invention will become apparent from the following detailed description of illustrative embodiments thereof, which is to be read in connection with the accompanying drawings.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

On preferred embodiment of the present invention discloses a south bridge chip supporting a plurality of buses. While the north bridge chip is designated to a bus specification, the south bridge chip switches to the supporting bus specification via the selection pins. The pins of the south bridge chip are altered to comply with the definition of the bus specification, such that the south bridge chip can simultaneously support various north bridge chips associated with different buses. Although the embodied embodiments exemplified by the present invention only describe the south bridge chip supporting a plurality of buses, the present invention can also apply to bus configuration between any two chips. Wherein one chip manages to support a plurality of bus specifications and the control timing on the bus can be altered via option pins so as to comply with the bus specification of another chip.

Figure 1:
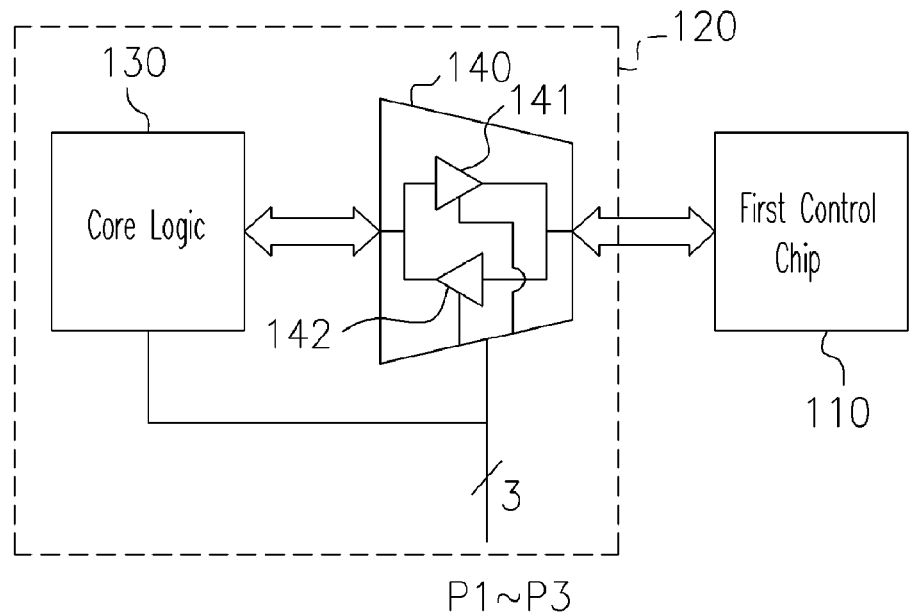
FIG. 1 is a schematic view of a control chip set and its control chip supporting a plurality of buses according to a preferred embodiment of the present invention.

FIG. 1 is a schematic view of a control chip set and associated control chip supporting a plurality of buses according to a preferred embodiment of the present invention. As shown in the drawing, the control chip set comprises a first control chip 110 and a second control chip 120. The first control chip 110 is, for example, a north bridge chip in a personal computer, wherein the first control chip 110 comprises a first bus selected one out of a group comprising a Peripheral Component Interconnection Express (PCI Express) bus, a Hyper Transport (HT) bus, and a VLINK bus. Notice that the first bus is the operating bus of the control chip set.

The second control chip 120 is, for example, a south bridge chip in a personal computer. In order to adapt to the north bridge chips associated with different buses to constitute a control chip set in a personal computer, the second control chip 120 must support a plurality of buses including the first bus used by the first control chip 110. A control timing is generated for driving different first bus such as the PCI Express bus, the HT bus, or the VLINK bus based on the choice of the selection pins. That is, when the first control chip 110 uses the PCI Express bus, the second control chip 120 has to select PCI Express bus function therein via the choice of the selection pins P1~P3. When the first control chip 110 uses the HT Express bus, the second control chip 120 has to select HT bus function therein via the choice of the selection pins P1~P3. When the first control chip 110 uses the VLINK bus, the second control chip 120 has to select VLINK bus function therein via the choice of the selection pins P1~P3. Therefore, the second control chip 120 can associate with different types of the first control chip 110, which are illustrated in FIGS. 2, 3, and 4.

Notice that data are differentially and uni-directionally transmitted on the PCI Express bus and the HT bus, whereas data are bi-directionally transmitted on the VLINK bus. Referring to FIG. 1 herein. The second control chip 120 not only comprises the device 130 that generates control timing of operating bus, but also comprises a driving circuit 140 coupled to the device 130 which enables bus pins on the second control chip 120 according to option pins P1~P3. Notice that the selection pins determines transmission directions of the buses, such as the PCI Express bus, the HT bus, or the VLINK bus.

The operating principle of the driving circuit 140 is to control a first driver 141 and a second driver 142 with the selection pins P1~P3 to enable the transmission direction of the operating buses associated with the first control chip 110. Where the different operating buses comprise the PCI Express bus, the HT bus, and the VLINK bus. The optional transmission directions include PCI Express buss transmission, PCI Express bus receiving, HT bus transmission, HT bus receiving and VLINK bus bi-directional transmission, which cases are illustrated in FIGS. 2, 3, and 4 respectively.

Figure 2:
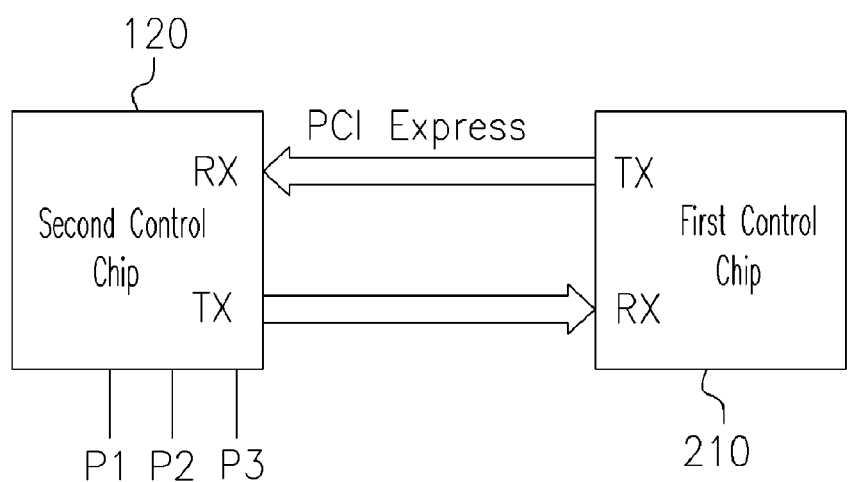
FIG. 2 is a schematic view of a PCI Express bus according to a preferred embodiment of the present invention.
Figure 3:
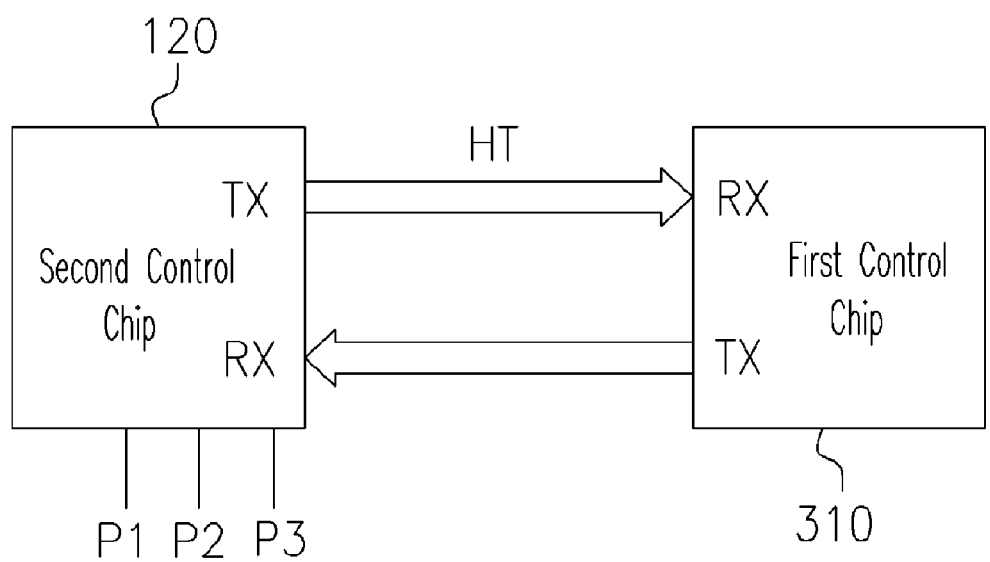
FIG. 3 is a schematic view of a HT Express bus according to a preferred embodiment of the present invention.
Figure 4:
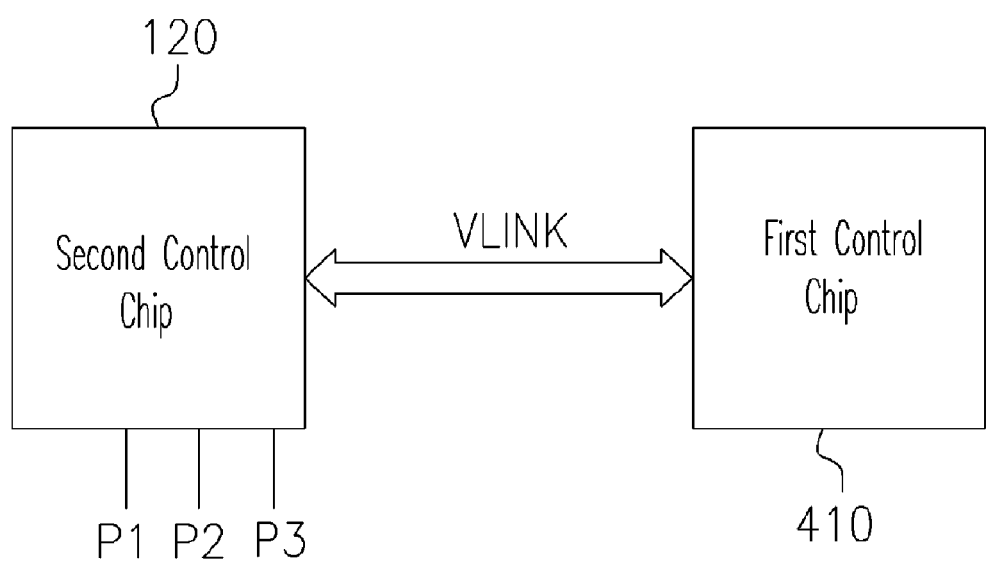
FIG. 4 is a schematic view of a VLINK Express bus according to a preferred embodiment of the present invention.

As embodied in FIGS. 2 and 3, the layout of the transmitting and receiving pins of the first control chip 210 with the PCI Express bus is substantially inverse to the layout of the transmitting and receiving pins of the first control chip 310 with the HT bus. That is, the transmitting pin of the first control chip 210 is on the top while the transmitting pin of the first control chip 310 is on the bottom. Therefore, the bus pins of the second control chip 120 shown in FIG. 2 must associate the top pin with working as a receiving pin, and the bus pins of the second control chip 120 shown in FIG. 3 must associate the top pin for working with a transmitting pin. Therefore, it is advantageous to apply this structure to associate the north bridge chip with different buses such as the PCI Express bus, the HT bus or the VLINK bus, and to select required transmission direction based on different pin layouts of the north bridge chip.

Although the south bridge chip supporting a plurality of buses is exemplified in the foregoing embodiments, it will be apparent to one of the ordinary skill in the art that the present invention can apply to the north bridge chip or other control chips for associated with different control chips. For example, such chip for supporting a plurality of buses can be a north bridge chip associated with the CPU having different bus specifications. On the other hand, it may be a south bridge chip associated with the CPU or the north bridge chip having different bus specifications.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A control chip for supporting a plurality of buses, comprising:
   a device, for generating control timing of an operating bus based on a choice of at least one of a plurality of selection pins; and
   a driving circuit, coupled to said device, for enabling a plurality of bus pins of the control chip to comply with a specification of the operating bus based on the choice of the selection pin.

2. The control chip of claim 1, wherein said buses comprise a PCI Express bus, a HT bus, and a VLINK bus.

3. The control chip of claim 2, wherein said control chip comprises the selection pins for selecting a transmission direction of said buses comprising:
   a transmission PCI Express bus for transmitting signals;
   a receiver PCI Express bus for receiving signals;
   a transmission HT bus for transmitting signals;
   a receiver HT bus for receiving signals; and
   a bi-directional VLINK bus for both transmitting and receiving signals.

4. The control chip of claim 1, wherein said driving circuit comprises a first driver and a second driver for enabling a transmission direction associated with the operating bus.

5. A control chip set, comprising:
   a first control chip having a first bus; and
   a second control chip for supporting a plurality of buses including the first bus and for generating a control timing complying with the first bus based on a choice of at least one of a plurality of selection pin.

6. The control chip set of claim 5, wherein said buses of the second control chip comprise a PCI Express bus, a HT bus, and a VLINK bus.

7. The control chip set of claim 6, wherein said second control chip comprises said selection pins for selecting a transmission direction of said buses supported by said second control chip comprising:
   a transmission PCI Express bus for transmitting signals;
   a receiver PCI Express bus for receiving signals, a transmission HT bus for transmitting signals;
   a receiver HT bus for receiving signals; and
   a bi-directional VLINK bus for both transmitting and receiving signals.

8. The control chip set of claim 5, wherein said second control chip comprises:
   a device for generating the control timing of said first bus based on the choice of said selection pin; and
   a driving circuit electrically coupled to said device for enabling a plurality of bus pins of said second control chip to comply with a specification of said first bus based on the choice of said selection pin.

9. The control chip set of claim 8, wherein said driving circuit comprises a first driver and a second driver for enabling a transmission direction associated with said first bus.

10. A south bridge chip supporting a plurality of buses, comprising:
    a device for generating a control timing of an operating bus based on a choice of at least one of a plurality of selection pin; and
    a driving circuit electrically coupled to said device for enabling a plurality of bus pins of said south bridge chip to comply with a specification of the operating bus based on the choice of said selection pin.

11. The south bridge chip of claim 10, wherein said buses comprise a PCI Express bus, a HT bus and a VLINK bus.

12. The south bridge chip of claim 11, wherein said south bridge chip comprises a plurality of selection pins for selecting a transmission direction of said supported buses comprising:
    a transmission PCI Express bus for transmitting signals;
    a receiver PCI Express bus for receiving signals;
    a transmission HT bus for transmitting signals;
    a receiver HT bus for receiving signals; and
    a bi-directional VLINK bus for both transmitting and receiving signals.

13. The south bridge chip of claim 10, wherein said driving circuit comprises a first driver and a second driver for enabling a transmission direction associated with the specification of said operating bus.

14. A control chip set, comprising:
    a north bridge chip having a first bus; and
    a south bridge chip for supporting a plurality of buses including said first bus and for generating a control timing complying with said first bus based on a choice of at least one of a plurality of selection pin.

15. The control chip set of claim 14, wherein said buses comprise a PCI Express bus, a HT bus, and a VLINK bus.

16. The control chip set of claim 15, wherein said south bridge chip comprises a plurality of selection pins for selecting a transmission direction of said buses supported by the south bridge chip comprising:
    a transmission PCI Express bus for transmitting signals;
    a receiver PCI Express bus for receiving signals;
    a transmission HT bus for transmitting signals;
    a receiver HT bus for receiving signals; and
    a bi-directional VLINK bus for both transmitting and receiving signals.

17. The control chip set of claim 14, wherein said south bridge chip comprises:
    a device for generating said control timing of said first bus based on the choice of said selection pin; and
    a driving circuit coupled to said device for enabling a plurality of bus pins of said second control chip to comply with a specification of said first bus based on the choice of said selection pins.

18. The control chip set of claim 17, wherein said driving circuit comprises a first driver and a second driver for enabling a transmission direction associated with said first bus.

* * * * *